United States Patent [19]

Dunsmore et al.

[11] Patent Number: 5,506,646
[45] Date of Patent: Apr. 9, 1996

[54] TEST FIRING OF A PHOTOGRAPHIC FLASH ASSEMBLY

[75] Inventors: Clay A. Dunsmore, Fairport; Bruce A. Alexander, Webster, both of N.Y.

[73] Assignee: Eastman Kodak Company, Rochester, N.Y.

[21] Appl. No.: 410,627

[22] Filed: Mar. 24, 1995

[51] Int. Cl.⁶ .................................................. G03B 15/03
[52] U.S. Cl. .............................. 354/149.11; 354/127.1; 354/288
[58] Field of Search .......................... 354/127.1, 127.11, 354/288, 289.1, 289.11, 289.12, 468, 149.11

[56] References Cited

U.S. PATENT DOCUMENTS 4,672,273   6/1987   Ikawa et al. .
4,954,858   9/1990   Ohmura et al. .
5,353,079   10/1994  Sakai et al. .

Primary Examiner—Michael L. Gellner
Assistant Examiner—Eric Nelson
Attorney, Agent, or Firm—Peter J. Bilinski

[57] ABSTRACT

A method of test firing an electronic flash in a camera during manufacturing assembly of the camera, in which the flash capacitor is pre-charged to an intermediate voltage level which is insufficient to test fire the flash using an external power supply. According to the present invention, the flash capacitor is then fully-charged to a level which is sufficient to test fire the flash, using the battery contained for the camera, and the flash is test fired. According to a preferred embodiment, the flash assembly is mounted within a camera body, and a front cover covers the flash. A set of holes in the front cover are accessible to allow fast charging of the flash capacitor during assembly of the camera.

4 Claims, 6 Drawing Sheets

TEST FIRING OF A PHOTOGRAPHIC FLASH ASSEMBLY

CROSS-REFERENCE TO RELATED APPLICATION

Reference is made to commonly assigned U.S. patent application Ser. No. 08/330,658 [Attorney Docket No. 68206b], entitled: SINGLE TOUCH FLASH CHARGER CONTROL, filed in the name of Clay A. Dunsmore.

FIELD OF THE INVENTION

The invention relates generally to the field of photography, and in particular to electronic flash assemblies. More specifically, the invention relates to a method of precharging a flash capacitor of a camera flash assembly during the manufacturing assembly of the camera.

BACKGROUND OF THE INVENTION

During the manufacturing assembly of single-use cameras having an electronic flash, it is preferred that the operation of the flash assembly be tested. This test verifies the operation of the flash charging and control circuits, as well as the flashing circuit and the battery used to power the flash.

Typically, during manufacturing the entirety of the flash assembly, including the camera battery is mounted to the camera body. The assembler then activates and holds a flash charging switch located on the camera body until a neon ready light is illuminated, indicating that the flash is adequately charged for firing. The flash can then be fired, such as by depressing the camera's shutter release button. It usually takes about 7–10 seconds to sufficiently charge the flash once the flash charging switch is first activated by the assembler.

In commonly assigned U.S. patent application Ser. No. 08/330,658 [Attorney Docket 68206b], an electronic flash is described having a one touch (or single touch) flash charging switch, eliminating the need for the user or the assembler to maintain contact with the flash control switch until the neon ready light indicates the flash is charged sufficiently for firing. This is a very "user-friendly" feature affecting the assembly and use of cameras having electronic flash assemblies of this type, as in the case of conventional flash circuits. However, even cameras having the one-touch flash charging control still require a discrete period of time, usually 7–9 seconds, for the charge storage device; that is, the charge capacitor, to reach an adequate voltage level to allow firing of the flash while also using the camera battery. This amount of time is significant to an assembly process, and potentially curtails mass production output of such cameras.

There is a need, therefore, to provide a means for test firing the electronic flash of a camera during the manufacturing assembly of the camera in a more time-effective manner.

SUMMARY OF THE INVENTION

The present invention is directed to overcoming one or more of the problems set forth above. Briefly summarized, according to one aspect of the present invention, a method of test firing an electronic flash in a camera is disclosed during the manufacturing assembly of the camera, comprising the steps of:

i) fast-charging a flash capacitor to a level which is insufficient to test fire the flash, using an external power supply;

ii) fully-charging the flash capacitor to a level which is sufficient to test fire the flash, using a battery for the camera; and, iii) test firing the flash.

According to a preferred embodiment of the present invention, the electronic flash is mounted in a camera body during the manufacturing assembly of the camera, and a front cover portion is then mounted to the body, covering the flash. A pair of holes in the front cover allow access to the flash capacitor for fast-charging.

An advantageous aspect of the present invention is that the flash assembly, including the camera battery can be tested in a more expeditious manner, by fast charging the flash capacitor to an intermediate voltage prior to charging of the flash for test firing. The savings in time afforded by a precharging technique as described is further magnified in the mass production of cameras, such as single-use cameras, utilizing the electronic flash assemblies.

Another advantageous aspect of the present invention is that the use of a external power supply for precharging the flash capacitor conserves the power of the battery which is used in the camera.

These and other aspects, objects, features and advantages of the present invention will be more clearly understood and appreciated from a review of the following Detailed Description of the Preferred Embodiments and appended Claims, and by reference to the accompanying drawings.

DETAILED DESCRIPTION OF THE INVENTION

The following embodiment describes the test firing of an electronic flash assembly which is specific to a single-use camera. It should be readily apparent, however, that the method described herein is applicable to other photographic applications.

Figure 1:
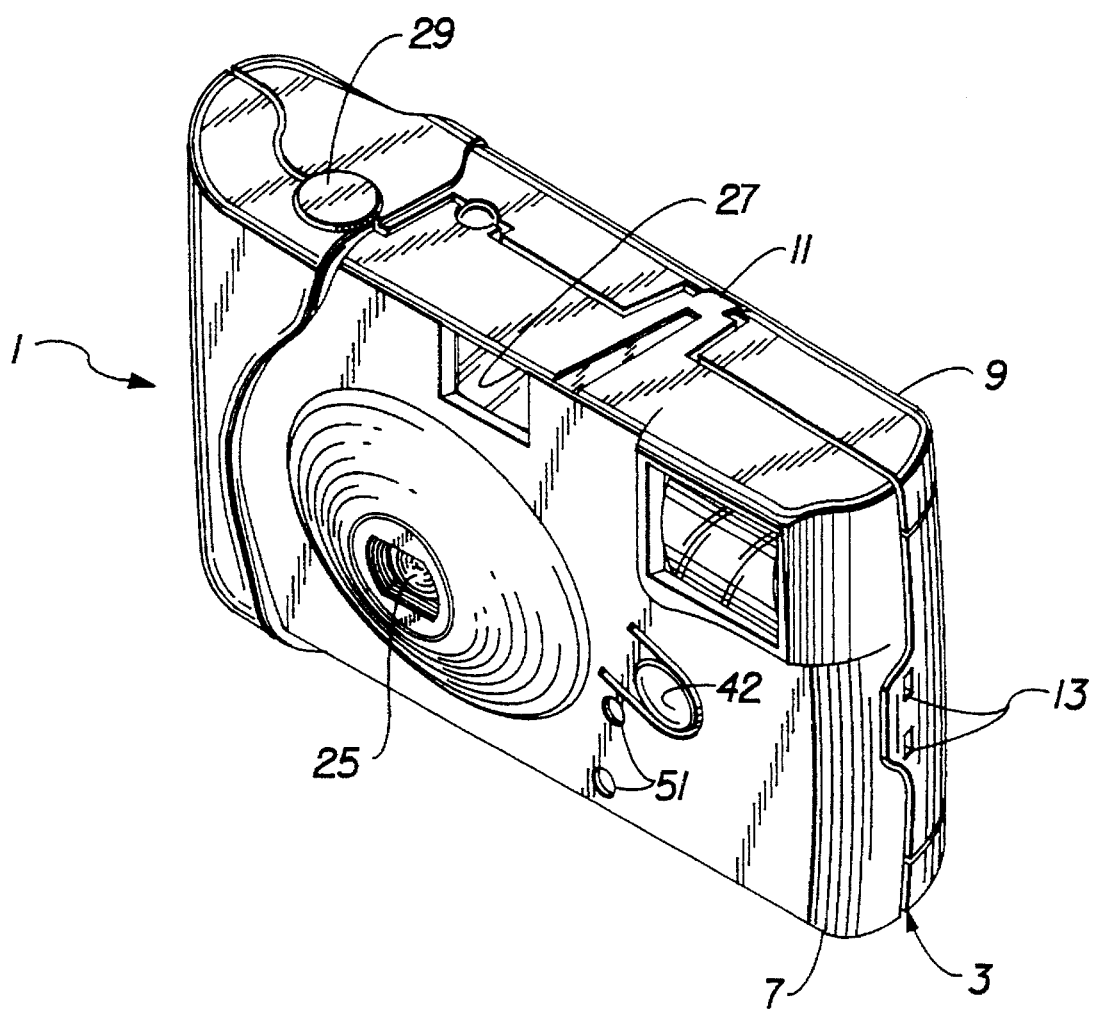
FIG. 1 is a front perspective view of a single-use camera used in accordance with a preferred embodiment of the present invention.
Figure 2:
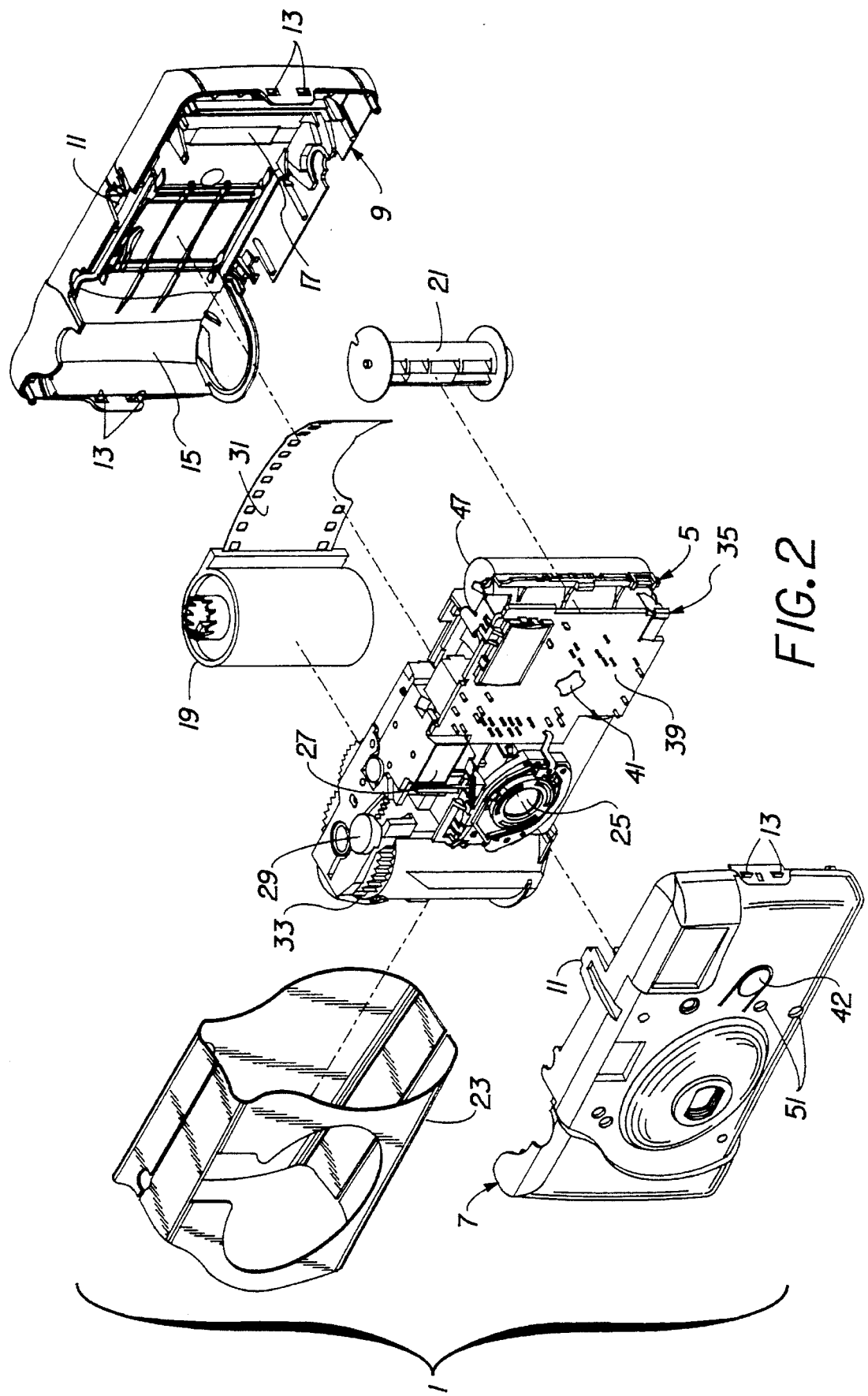
FIG. 2 is an exploded front perspective view of the single-use camera illustrated in FIG. 1.
Figure 3:
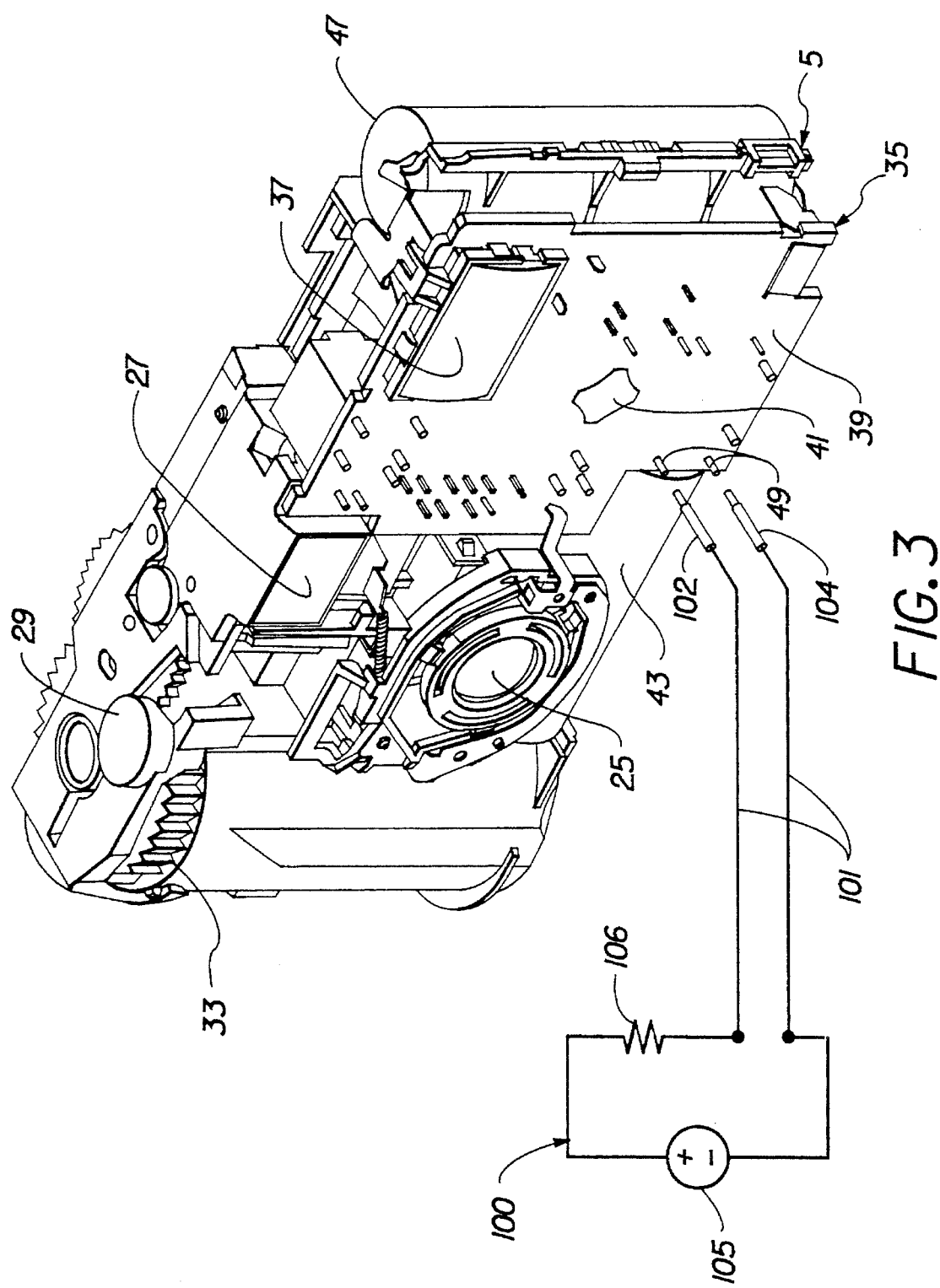
FIG. 3 is a partial front perspective view of the frame of the camera of FIGS. 1 and 2, including an external power charger for pre-charging the electronic flash assembly.

Referring to FIGS. 1–3, there is shown a one-time use camera 1 (this type of camera is also commonly referred to as a single-use camera) having a plastic molded body 3, including a frame section 5 defining a middle portion of the camera which is used to retain the majority of photographic components of the camera 1, as described briefly below. A front cover section 7 and a rear cover section 9 are snap fitted together to the front and rear of the frame portion 5, respectively, by snaps 11, 13 in the manufacturing assembly of the camera 1. Details relating to the assembly of the cover assemblies of the camera shown in this embodiment are described in commonly assigned U.S. application Ser. No. 08/327,250 [Attorney Docket No. 71140] entitled: COVER ASSEMBLY FOR CAMERA by James Boyd. A pair of molded chambers 15, 17 are provided in the rear of the frame portion 5 and the rear cover section 9 for housing a film cassette 19 and a take-up spool 21, respectively. When finally assembled, a decorative label 23 is attached to the exterior of the camera body 3.

The camera 1 also includes a taking lens 25 and a viewfinder 27, as are commonly found in other photographic cameras, as well as a depressable shutter release button 29 located on the top of the camera body 3. The filmstrip 31 contained within the film cassette 19 is prewound onto the take-up spool 21 for advancement back into the cassette by means of a film advance wheel 33 which pulls film from the take-up spool over a sprocket (not shown) across an exposure gate (not shown) and into the cassette.

Still referring to FIGS. 1–3, an electronic flash assembly 35 is attached to the frame portion 5 of the camera 1. Briefly, this assembly includes a flash head 37; a circuit board 39; a momentary switch 41 attached to the circuit board; a flash capacitor 43 mounted lengthwise beneath the taking lens 25; and a direct current power source 45, such as a battery 47. A pair of external leads 49 connected to the flash capacitor 43 extend from the facing surface of the circuit board 39, the purpose of which are described below. When assembled, the camera 1 includes a cantilevered portion 42 of the front section 7 which serves to access the momentary switch 41 in a manner which is also described below.

Figure 4:
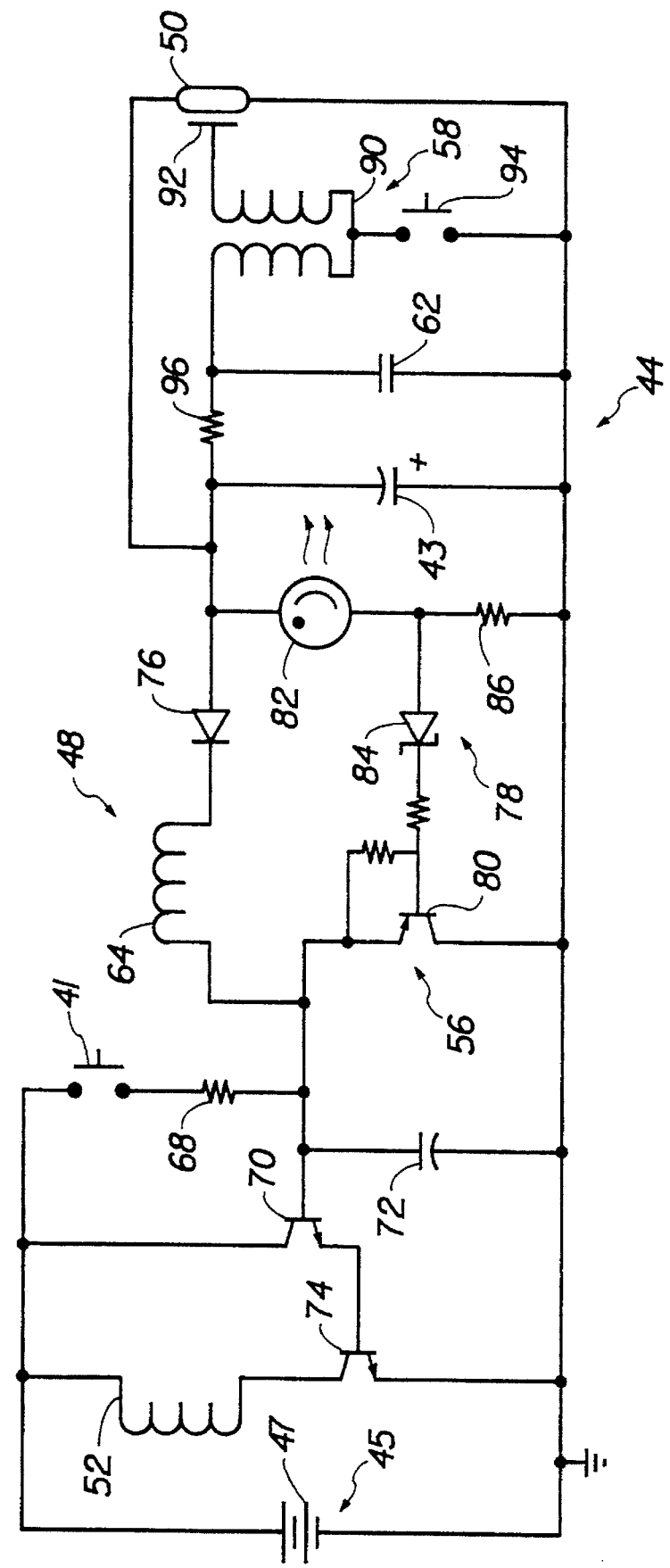
FIG. 4 is an electrical schematic diagram of a flash charging and control circuit of the electronic flash assembly depicted in FIGS. 2 and 3.

Referring to the electrical schematic of FIG. 4, the flash assembly 35 includes a charging and control circuit 44, including the battery 47; a self-oscillating flash charging circuit 48, including the flash capacitor 43; an oscillation arresting circuit 56, and a flash trigger circuit 58.

As noted above, the power source 45 includes one or more batteries 47 of predetermined voltage, supplied with the camera 1 in this preferred embodiment and without provision for replacement.

Referring specifically to the electrical schematic of FIG. 4, the self-oscillating charging circuit 48 includes a voltage converting transformer having primary and secondary windings 52, 64, respectively; the previously referred to momentary switch 41 for initiating oscillations in the circuit; a resistor 68 placed in series with the momentary switch 41; ganged transistors 70, 74, acting as switching elements for supporting and maintaining the oscillations; and a diode 76 for rectifying current induced in the secondary windings 64 of the transformer.

Normal charging of the flash assembly 35 is initiated by a single depression of the momentary switch 41, thereby establishing current flow through the resistor 68, transistors 70, 74, and the primary transformer winding 52. The switch 41 connects the base of the transistor 70 to the battery 47 through the resistor 68. Current flowing from the battery 47 into the base of the transistor 70 is multiplied by a transistor gain of fifty (50) and flows to the base of the transistor 74. The current is multiplied again at the transistor 74, with a gain of two hundred (200), and flows through the collector of transistor 74 and the transistor primary winding 52. As the current flow builds in the primary winding 52, it inductively induces current flow in the secondary winding 64. Current flows out of the capacitor, charging the capacitor 43, and into the base of the transistor 70, providing positive feedback.

The oscillation arresting circuit 56 includes a voltage sensor 78 and a digital pnp transistor 80 or gate. The voltage is sensed by a neon ready light 82 which is connected in series with a zener diode 84. The neon ready light 82 begins conducting at two hundred seventy volts (270 v.), but the voltage drop across the ready light falls to two hundred and twenty volts (220 v.) when it is conducting. The voltage sensor 78, which includes the ready light 82 and the zener diode in series, begins conducting at about three hundred and thirty volts (330 v.), which also represents a predetermined or full charge desired on flash capacitor 43. As used in this specification, the term full charge on the flash capacitor 43 is used to mean that charge or voltage desired for application to the electronic flash when it is fired.

According to this embodiment, when the voltage across the flash capacitor 43 reaches two hundred seventy volts (270 v.), the neon ready light 82 begins to conduct, illuminating the neon ready light and providing notification to the user there is sufficient charge on the flash capacitor 43 to initiate an exposure sequence. The capacitor 43 is not fully charged, however, and charging continues until the charge on the capacitor 43 reaches three hundred thirty volts (330 v.). When the flash capacitor 43 is fully charged, the zener diode 84 begins to conduct, applying current to the base of the transistor 80, switching the transistor 80 on, and grounding the self-oscillating charging circuit 48. Oscillations in the circuit 48 are thereby arrested, and charging stops.

Summarily, the neon ready light 82 serves several functions. First, the light conducts when the flash capacitor 43 exceeds a ready voltage to indicate there is sufficient charge on the capacitor to initiate an exposure using the camera 1. Second, the light also serves as a component in a voltage sensing trigger circuit 58 that stops charging of the flash capacitor 43 when the capacitor reaches a predetermined or full voltage greater than the ready voltage. Third, the neon light 82 is part of two electrical loops, each serving different functions. The first electrical loop includes the flash capacitor 43, the ready light 82 and the resistor 86. This loop conducts continuously when the capacitor charge is above the ready charge, turning the ready light 82 on. The second electrical loop includes the capacitor 43, the ready light 82, the zener diode 84, and the transistor gate 80. This loop controls the charging circuit and conducts momentarily to trigger the charging circuit off when the capacitor charge reaches the predetermined or full charge. The momentary conduction momentarily increases the illumination of the neon ready light 82, and thereby indicates when the predetermined charge is attained.

The flash trigger circuit 58, is used in commercially available single-use cameras, and will not be described in detail. Briefly, the circuit 58 includes a triggering capacitor 62, a voltage converting transformer 90, a flash triggering electrode 92, and a synchronizing switch 94. The triggering capacitor 62 is charged by current flow through the secondary winding 64 at the same time and in the same manner as the flash capacitor 43. In normal operation, the synchronizing switch 94 is closed by the camera shutter button 29 at the proper time in the exposure sequence. The capacitor 62 discharges through the primary windings of the voltage converting transformer 90, inducing about four thousand volts (4 kv.) in the triggering electrode 92, and ionizing the gas in the flash tube 50. The flash capacitor 43 then discharges through the flash tube 50, exciting the ionized gas and producing sufficient flash illumination. An additional capacitor 72 according to this embodiment provides filtering on the base of the transistor 70 to keep the circuit from inadvertently turning on due to undesirable noise, such as the neon ready light 82 turning off or from battery bounce.

Additional details relating to the flash control and charging circuit 44, including the oscillation arresting circuit 56 and the self-oscillating flash charging circuit 48, are described in commonly assigned U.S. patent application Ser. No. 08/330,658 [Attorney Docket 68206b] entitled: SINGLE TOUCH FLASH CHARGER CONTROL by Clay A. Dunsmore, which is hereby incorporated by reference.

Having now described the normal operation of the electronic flash circuit 44 of this preferred embodiment and referring again to FIGS. 3 and 4, the manufacturing of the described flash assembly 35 is herein described. First, the flash assembly 35, is mounted within the plastic camera body 3 at an assembly turntable (not shown).

Specifically, the electronic flash assembly 35, including the battery 47, is mounted to the frame section 5 in a manner commonly known. The front cover section 7 has not yet been attached to the frame section 5.

An external power charger 100 is employed to directly inject a pre-charge voltage into the flash capacitor, bypassing the battery 47 and the charging circuit 44. A pair of contact leads 102, 104 extending from a power cable 101 are brought into direct contact with the external leads 49. The external power charger 100 includes a high voltage power supply 105 which is connected in series with a current limiting resistor 106.

It is intended that the operation of the charging circuits 44, 48 be verified during the test firing of the flash, therefore, it is preferred that a voltage level just below the voltage level (270 v.) required to illuminate the neon ready light 82 be injected into the flash capacitor 43 using the external power charger 100. The current limiting resistor 106 is chosen to have a resistance (R-limit) which provides for a short charge time, but limits the charging current to a safe level. In this particular embodiment, the voltage setting of the power supply 105 is about 260 volts (260 v.), and R-limit is approximately 2000 ohms.

Figure 6:
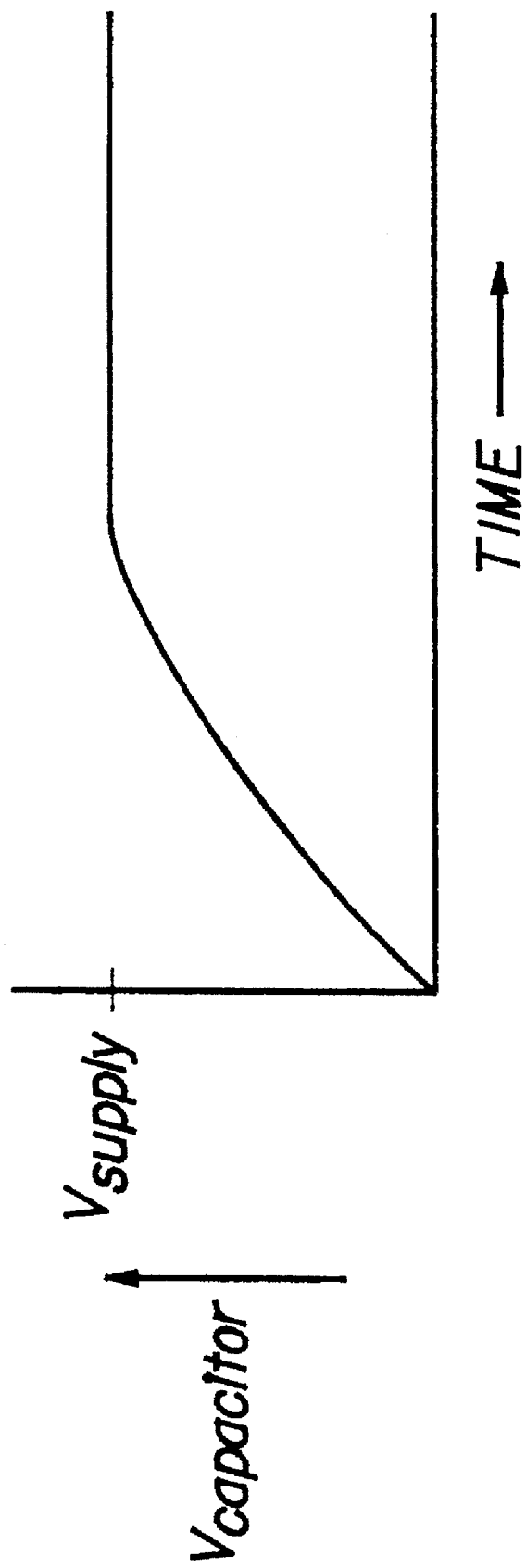

The voltage level on the flash capacitor 43 generally increases according to the relationship illustrated in FIG. 6. The amount of time at which the precharge voltage level is reached is dependent upon the capacitance of the flash capacitor 43, the resistance (R-limit) of the resistor 106, and the voltage setting of the high voltage power supply 105. In this particular embodiment, the flash capacitor 43 has a capacitance of about 160 micro farads, and the amount of time required to reach the predetermined precharge voltage of (260 v) is about 1 second, using the external power charger 100. Comparatively, using the flash battery 47 and the momentary switch 41 approximately 7–9 seconds are required.

The contacts 102, 104 of the external power charger 100 are then removed from the external leads 49, and the charging circuit 44 is tested by depressing the momentary switch 41 which engages the self-oscillating flash charging circuit 48, as described above, to complete the charging of the flash capacitor 43 to a test fire voltage of (330 v.) and illuminates the neon ready voltage light 82, which is illuminated along the way at (270 v.), as previously detailed. The flash can then be test fired by depressing the shutter release button 29, in a manner commonly known.

Alternatively, the front cover section 7 having snap engagement means 11, 13 can be attached to the front of the camera body 3, including the mounted flash assembly 35, prior to the direct injection of the precharge voltage to the flash capacitor 43. The front cover section 7 includes a pair of access openings 51, FIGS. 1 and 2, which align with the external capacitor leads 49 when assembled thereto.

The contact leads 102, 104 extending from the external power charger 100 can then access the external capacitor leads 49 through the holes 51, FIGS. 1,2, in the front cover section 7 and the capacitor 43 can be pre-charged in the manner described above.

Figure 5:
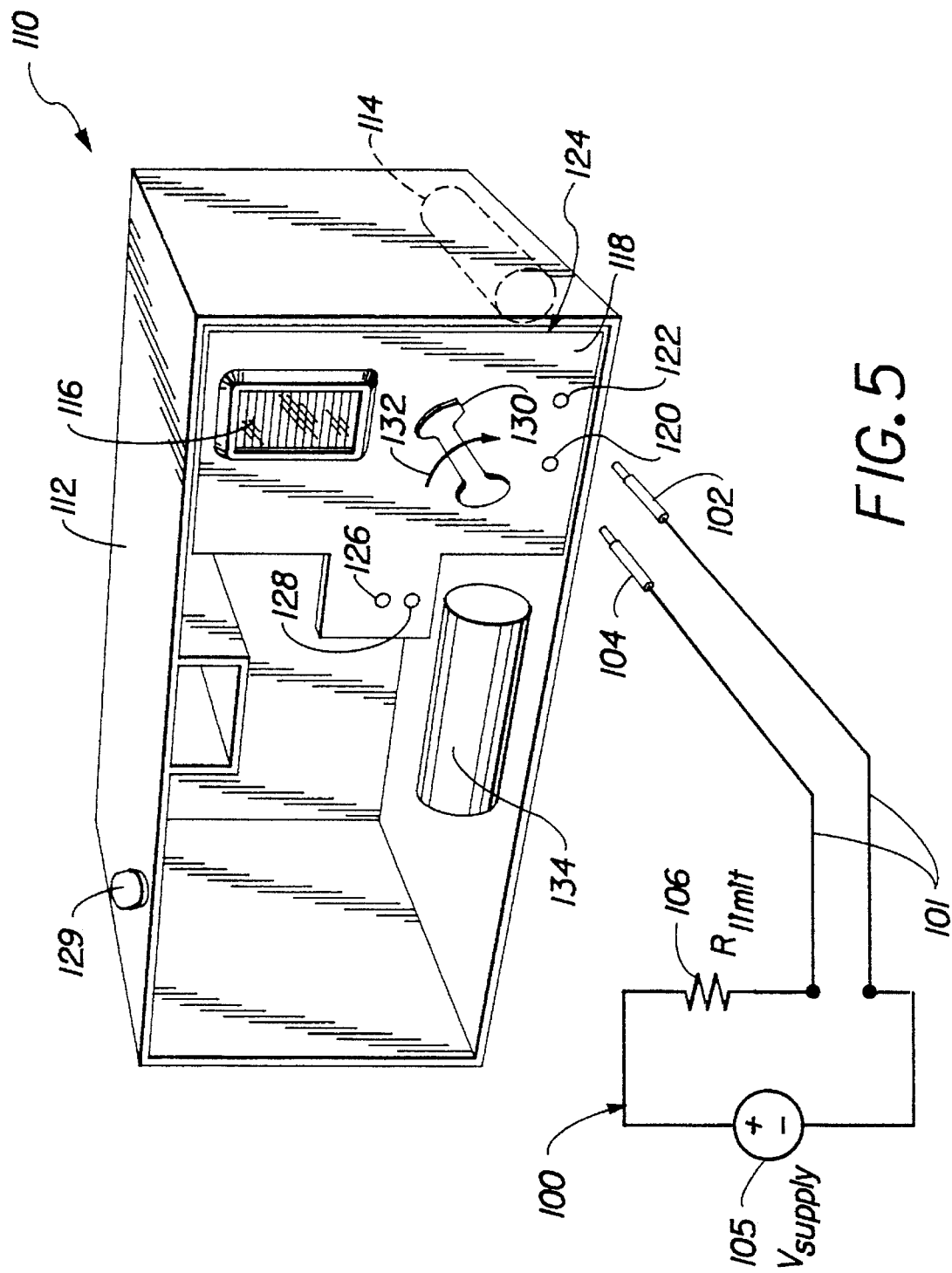
FIG. 5 is a front perspective, partially schematic view of a flash precharging operation, as performed on a camera according to a second embodiment of the present invention; and, FIG. 6 is a graphical representation of the relationship between voltage level and time for an electronic flash circuit, such as shown in FIG. 4.

Referring now to FIG. 5, it can be seen that the external power charger 100 can also be used to improve the manufacturing assembly time of other electronic flash assemblies. According to this FIG., a camera 110 is shown having a body section 112 with a front cover (not shown) removed. The camera 110 includes an electronic flash assembly 114 including a flash head 116 having a flash discharge tube (not shown), a circuit board 118 including a pair of external leads 120, 122, a flash capacitor 124 (shown in phantom), a synch switch 126 and contact 128, a biased flash activation switch 130 and a flash battery 134. The camera 110 also includes a shutter release button 129. Each of the above features, including the operation of the flash assembly 114, are commonly known in the field.

In operation, the flash assembly 114 can also be test fired in a more expeditious manner by directly applying a predetermined voltage across the external leads 120, 122 using the external power charger 100, in the manner described above. This voltage level should be sufficiently less than that required for fully charging the flash capacitor 124 in order to test the charging circuit (not shown). After the initial precharge voltage has been applied to the flash capacitor 124, a full charge of the capacitor 124 can be completed by activating the biased switch 130 by closing the switch 130 in the direction shown by arrow 132 and utilizing the circuitry of this particular flash assembly (not shown, but conventionally known) including the flash battery 134. By first applying an intermediate voltage level to the flash capacitor 124, the time taken to fully charge the capacitor is significantly dropped; in this case from about 6–9 seconds to about 1–2 seconds.

The invention has been described with reference to a preferred embodiment. However, it will be appreciated that variations and modifications can be effected by a person of ordinary skill in the art without departing from the scope of the invention.

PARTS LIST FOR FIGS. 1–6

1 single-use camera
3 plastic body
5 frame portion
7 front cover
9 rear cover
11 snap engagement feature
13 snap engagement feature
15 chamber
17 chamber
19 film cassette
21 film spool
23 label
25 taking lens
27 viewfinder
29 shutter release button
31 filmstrip
33 film advance wheel
35 electronic flash assembly
37 flash head 39 circuit board
41 momentary switch
42 cantilevered portion of front cover
43 flash charge capacitor
44 flash charging and control circuit
45 direct current power source
47 battery
48 self-oscillating flash charging circuit
49 external capacitor leads
50 flash tube
51 access openings
52 primary transformer winding
56 oscillation arresting circuit
58 flash trigger circuit
62 triggering capacitor
64 secondary transformer winding
68 resistor
70 transistor
72 capacitor
74 transistor
76 rectifying diode
78 voltage sensor
80 digital transistor
82 neon ready light
84 zener diode
86 resistor
90 transformer
92 flash triggering electrode
94 synch switch
96 resistor
100 external power charger
101 power cable
102 contact lead
104 contact lead
105 power supply
106 limiting resistor
110 camera
112 body section
114 electronic flash assembly
116 flash head
118 circuit board
120 lead
122 lead
124 flash capacitor
126 synch switch
128 contact
129 shutter release button
130 switch
132 arrow
134 flash battery

We claim:

1. A method of test firing an electronic flash in a camera during manufacturing assembly of the camera, comprising the steps of:

i) fast-charging a flash capacitor to a level which is insufficient to test fire the flash, using an external power supply;

ii) fully-charging the flash capacitor to a level which is sufficient to test fire the flash, using a battery for the camera; and, iii) test firing the flash.

2. A method as claimed in claim 1, including the step of mounting said flash to the camera body prior to the fast-charging step.

3. A method as recited in claim 2, including the steps of:

mounting a front cover portion over said flash, said front cover portion having a set of holes aligned for accessing said flash capacitor prior to fast-charging said capacitor.

4. A method as recited in claim 1, wherein a voltage of about 330 volts is sufficient to test fire the flash, and the capacitor is fast-charged to a level just below 270 volts.

* * * * *